United States Patent
Ramos-Elizondo et al.

(10) Patent No.: US 8,020,768 B2
(45) Date of Patent: Sep. 20, 2011

(54) PORTABLE CONTAINER INVENTORY CONTROL SYSTEM

(75) Inventors: Rafael-Guillermo Ramos-Elizondo, Monterrey (MX); Jose-Adalberto Terán-Matus, Nuevo León (MX)

(73) Assignee: RFID Mexico, S.A. DE C.V., Nuevo Leon (MX)

( * ) Notice: Subject to any disclaimer, the term of this patent is extended or adjusted under 35 U.S.C. 154(b) by 0 days.

(21) Appl. No.: 12/416,315

(22) Filed: Apr. 1, 2009

(65) Prior Publication Data
US 2010/0252626 A1 Oct. 7, 2010

(51) Int. Cl.
*G06F 19/00* (2011.01)
*G06F 17/00* (2006.01)

(52) U.S. Cl. ......... 235/385; 235/375; 235/487; 235/492

(58) Field of Classification Search .............. 235/487, 235/492; 340/10, 572
See application file for complete search history.

(56) References Cited

U.S. PATENT DOCUMENTS

| | | | |
|---|---|---|---|
| 4,473,373 A | 9/1984 | Weiss | |
| 6,317,044 B1 | 11/2001 | Maloney | |
| 6,427,913 B1 | 8/2002 | Maloney | |
| 6,662,078 B1 | 12/2003 | Hardgrave | |
| 6,959,862 B2 * | 11/2005 | Neumark | 235/385 |
| 6,989,749 B2 | 1/2006 | Mohr | |
| 7,180,420 B2 | 2/2007 | Maurer | |
| 7,221,276 B2 | 5/2007 | Olsen, III et al. | |
| 7,250,865 B2 | 7/2007 | Maloney | |
| 7,348,884 B2 * | 3/2008 | Higham | 340/572.1 |
| 2002/0057208 A1 * | 5/2002 | Lin et al. | 340/825.49 |
| 2003/0102970 A1 * | 6/2003 | Creel et al. | 340/568.1 |
| 2007/0040682 A1 * | 2/2007 | Zhu et al. | 340/572.1 |
| 2008/0017709 A1 * | 1/2008 | Kennedy | 235/385 |
| 2008/0059338 A1 | 3/2008 | Hubbard | |
| 2008/0088454 A1 * | 4/2008 | Flores et al. | 340/572.4 |
| 2008/0120200 A1 * | 5/2008 | Hurtis et al. | 705/28 |
| 2009/0072029 A1 * | 3/2009 | Martin | 235/385 |

\* cited by examiner

*Primary Examiner* — Michael G Lee
*Assistant Examiner* — Matthew Mikels
(74) *Attorney, Agent, or Firm* — Young & Thompson

(57) ABSTRACT

A portable container inventory control system uses RFID technology for automatically monitoring the taking and returning operations of items such as, but not limited to, tools, weapons, jewelry, surgical instruments, from one or more receptacles inside a portable container to maintain a status of each item as well as an operational record of each item. Furthermore, the system may register which item has been taken from or stored from which receptacle by which worker and when it was taken and returned, and compile the information of all storage locations in one database and system for administering, reporting and sending alarms in order to have total item control, accountability, item service control (maintenance, calibration, repairs, and/or replacement), and administration of usage for the items controlled by the system.

11 Claims, 3 Drawing Sheets

PORTABLE CONTAINER INVENTORY CONTROL SYSTEM

BACKGROUND OF THE INVENTION

A. Field of the Invention

The present invention is related to systems for tracking items inside a predetermined area and more particularly to an item tracking system for controlling the inventory of items inside a portable container such as, but not limited to, tool boxes.

B. Description of the Related Art

There are certain industries such as the aeronautic industry, arms industry, jewelry industry, hospitals, etc. which requires the employees to manipulate and manage many valuable, important or dangerous items such as tools, jewels, medicines which have to be carefully controlled and tracked. Sometimes, it is necessary to store these items in portable containers (for example tool boxes) so that the employees can take the items where needed and accordingly, only the employees that are authorized to have access or to use certain items contained in a portable container are allowed to take the container with them for a predetermined period of time. The portable containers are associated with a base. During such period of time, the employee is fully responsible for the portable container and its contents.

Furthermore, if any item is lost, the loss is detected only when the portable container returns to its base and the contents thereof are verified. Normally at such time, the lost item may represent a danger for the facility, for example, the item may be lost in an industrial environment in which any non controlled item may cause an accident or in a medical environment in which the lost of an item, for example an scalpel, represents a contingency which should be detected immediately since the item may have been left inside a patient's body during surgery. In the case of jewelry, lost jewelry represents a financial loss and a perhaps an indication of a security problem.

US patent application No. 20080059338 of Hubbard, describes a method and an apparatus for portable container inventory for electronically inventorying an electronically locked and unlocked portable container before and after REID (Radio Frequency IDentification) tagged tools are accessed by an authorized user. A record of tools added and/or removed along with the identity of the accessing user is generated and stored. At any desired time, a record may be generated of tagged tools in the portable container or, alternatively, a list of tagged tools missing from assigned positions in the portable container.

The method disclosed in US patent application No. 20080059338 comprises reading a close proximity user RFID tag in association with a given portable container as a first event; comparing data obtained from the user RFID tag at the first event with users authorized to access the given portable container; preparing a first inventory list of all presently readable tools initially in the portable container; reading a close proximity user RFID tag in association with the given portable container, after closure of the given portable container, as a second event; preparing a second inventory list of all presently readable tools remaining in the given portable container; and transmitting a record indicative of the difference between the first and second inventory lists to a database for storage along with an indication of the user that caused the change in portable container inventory. In addition to the foregoing, other method aspects are described in the claims, drawings, and text forming a part of the patent application.

Furthermore, the system disclosed in US patent application No. 20080059338 comprises an electronically lockable portable container that includes a plurality of RFID (radio frequency identification) tagged tools stored ill the electronically lockable portable container, each of the RFID tagged tools having an RFID tag operating as an identifier for each of the tools; a first RFID reader mounted on the electronic ally lockable portable container the first RFID reader is adapted to read RFID tags for each of the tools to determine tools added as well as tools removed by an authorized user between an event signifying an unlocking and opening of the portable container and al event signifying a complete closure and locking of the portable container, the first REID reader reading and recording the RFID tag for each of the tool s which the authorized user removed from and/or added to the electronically lockable portable container; a close proximity second RFID reader mounted on the electronically lockable portable container, the close proximity second RFID reader being adapted to read a user supplied RFID device; and all identification device having a radio frequency identification device imbedded therein, the identification device configured to enable a portable container user to identify the user as an individual authorized to remove one or more of the plurality of RFID tagged tools from and/or add one or more of the plurality of RFID tagged tools to the electronically lockable portable container.

The portable container is configured with a plurality of receptacles wherein at least some of the receptacles conforms to the shape of given RFID tagged tools; an electronically controlled lock coupled to the portable container, the electronically controlled lock configured to activate while the portable container is in a closed condition, the electronically controlled lock further configured to secure tools in the portable container and operable when deactivated to allow access to the given RFID tagged tools in the portable container; a first RFID reader coupled to the portable container, the first RFID reader configured to read each of the given RFID tagged tools in the portable container; a user identifier operable to generate a first event signal that an identified user wishes to access the contents of the portable container and to generate a second event signal when the identified user wishes to close and secure access to the contents of the portable container; and logic means, electrically connected to the electronically controlled lock, the first RFID reader and the user identifier, the logic means configured to (a) initiate a scan of a one or more tagged tools in the portable container upon receipt of the first event signal, (b) record the identity of the identified user initiating the first event signal, (c) generate a first list of the one or more tagged tools detected in the portable container, (d) deactivate the lock means whereby the one or more tagged tools in the portable container may be accessed, (e) activate the lock whereby the one or more tagged tools in the portable container may no longer be accessed upon receipt of the second event signal, (f) initiate a second scan of the one or more tagged tools in the portable container, (g) record the identity of the user initiating the second event signal, (h) generate a second list of the one or more tagged tools detected in the portable container, and (i) generate, after comparing the first and second list, a record of the one or more tagged tools removed and/or added to the portable container between the first and second event signals.

The method and system disclosed in Hubbard's patent application obtains an inventory of tools between an event signifying an unlocking and opening of the portable container and an event signifying a complete closure and locking of the portable container, but it is not capable of registering taking and returning operations during the time the portable container is opened. Furthermore, Hubbard discloses the use of two RFID readers: one for reading RFID tags for each of the tools and one for reading a user supplied RFID device.

Since there is only one RFID reader for reading all of the RFID tags for each of the tools, the system has no means for registering when the item is being returned to a respective receptacle, which is relevant for some working environments, especially when there are two or more identical items and one or more of them require maintenance since a worker may take an inoperable item that should not be stored in an specific receptacle.

SUMMARY OF THE INVENTION

In view of the above referred problems, applicant developed a portable container inventory control system which uses RFID technology for automatically monitoring the taking and returning operations of items such as, but not limited to, tools, weapons, jewelry, surgical instruments, from one or more receptacles inside a portable container which allows to have a status of each item as well as the operational record of each item. Furthermore, the system is capable of registering which item has been taken from which receptacle or was stored (returned) into which receptacle by which worker and when item was taken/returned, and compile the information of all storage locations in one database and system for administering, reporting and sending alarms in order to have total item control, accountability, item service control (maintenance, calibration, repairs, and/or replacement), and administration of usage for the items controlled by the system.

Applicant's system is able to provide a tight control over each item and an immediate control over taking and returning operations. Furthermore, applicant's system allows registering the using history of each item, control of the items needing service, record of the usage of each item, among other functionalities.

Since the present inventive system associates each taking and returning operation with a respective worker, it is very difficult to return a different item into a receptacle, since the system would detect that the item is associated to other employee. Additionally, the invention advantageously prevents that the RFID tag may be easily removed from the item and attached to another item, in that the present system requires that each RFID tag be attached to the item by means of special substances already available in the market which practically "integrates" the RFID tag to the item in such way that if someone tries to detach the tag from the item, the RFID tag is damaged and thereby rendered inoperative, thus avoiding fraudulent practices.

It is therefore a main object of the present invention to provide a portable container inventory control system which uses RFID technology for automatically monitoring the taking and returning operations of items from at least one pad placed into the portable container, each pad having at least one receptacle to receive and store a corresponding item placed therein, each pad in turn being placed into the portable container.

It is another main object of the present invention, to provide a portable container inventory control system of the above referred nature which is capable of registering the operational record of each item inside every receptacle of every pad placed into a portable container, controlling the items needing service, recording the usage of each item stored into a portable container, among other functionalities.

It is a further object of the present invention to provide a portable container inventory control system of the above referred nature, which associates each taking or returning operation for every portable container with a respective worker and registers taking and returning operations, thus maintaining a register of which items pertaining to specific receptacles of every pad of a respective portable container are being used by each worker.

It is an additional object of the present invention to provide a portable container inventory control system of the above referred nature which avoids any worker returning a wrong item and prevents a worker returning an item to a different receptacle from where the item was originally taken.

Each predetermined time period (for example each 300 seconds) the portable container inventory control system carries out an inventory for determining when was the last time in which an item was detected in its corresponding receptacle in order that, in case of a loss of an item, the system allows to determine when the item was lost, the place and the moment in which the item was lost.

The invention may include a manual mechanism (such as to click a button) or an automatic mechanism (such as by using a pedometer, GPS or any other known mechanism of this nature) to identify when the portable container is moved from a place, the movement causing that each pad to wirelessly communicate with the other pads pertaining to the same portable container, and validates if some of these receptacles are empty and if any of the receptacles are empty, the system indicates witch receptacle or receptacles are empty and which item or items are missing.

These and other objects and advantages of the portable container inventory control system of the present invention will become apparent to those persons having an ordinary skill in the art, from the following detailed description of the embodiments of the invention which will be made with reference to the accompanying drawings.

DETAILED DESCRIPTION OF PREFERRED EMBODIMENTS OF THE INVENTION

The portable container inventory control system of the present invention will be described referring to the accompanying drawings illustrating preferred embodiments of the invention.

In a preferred embodiment, the portable container inventory control system of the present invention is used in a workshop in which there are In use one or more portable containers, each portable container containing one or more pads, each pad having a plurality of receptacles, each receptacle storing a correspondent tool (or other item), wherein each receptacle comprising an individually shaped receptacle for receiving a corresponding specific tool which can be taken and returned, wherein the shape of the receptacle matches to the shape of the tool.

Figure 2:
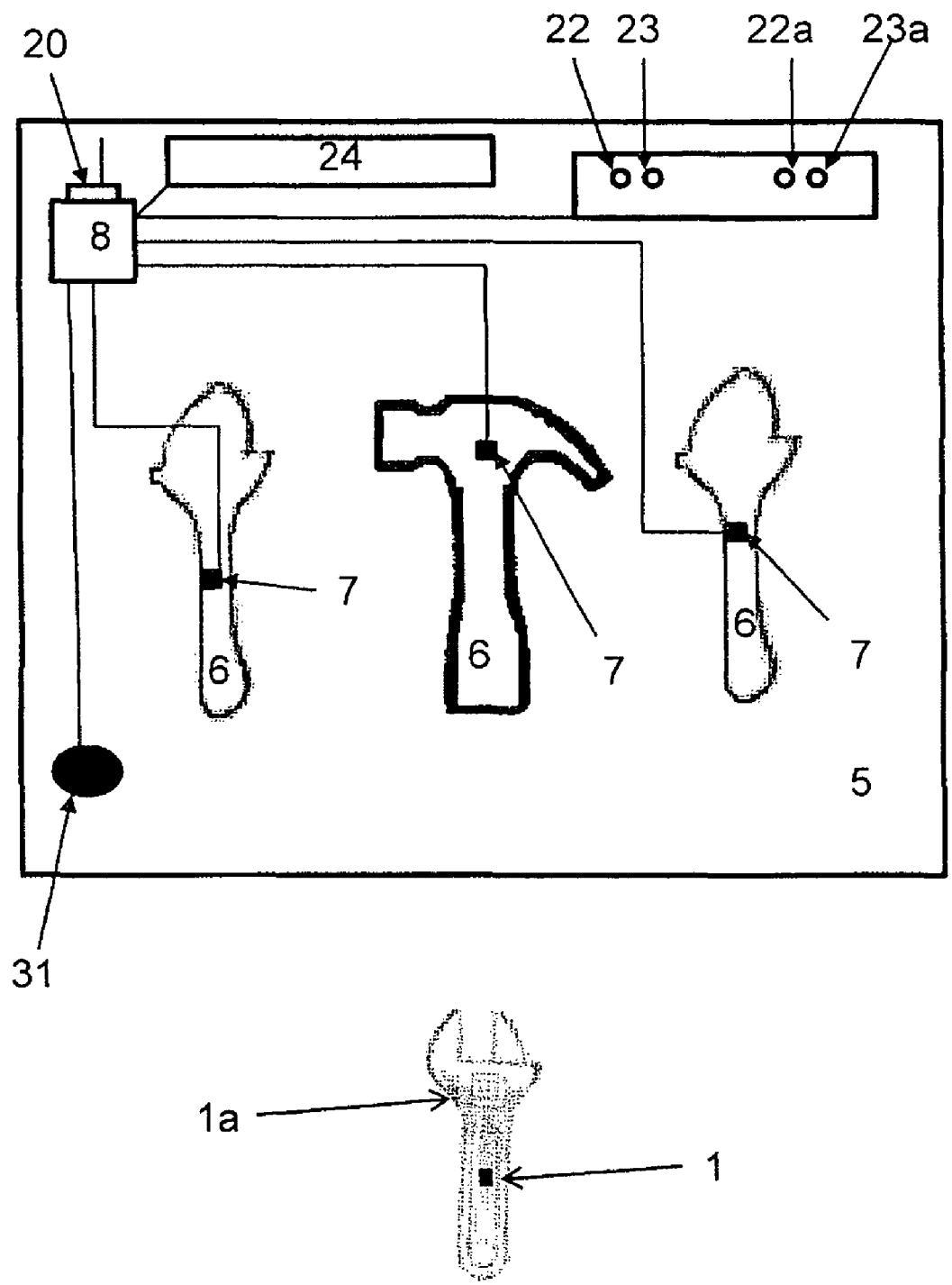
FIG. 2 is a schematic view of a pad in accordance with the portable container inventory control system of the present invention.

With reference to FIG. 2, the container inventory control system of the present invention comprises a RFID chip 1 for each item (tool), each RFID chip permanently joined to the item and each REID chip having information such as, but not limited to: tool ID, tool description and serial number.

Figure 1:
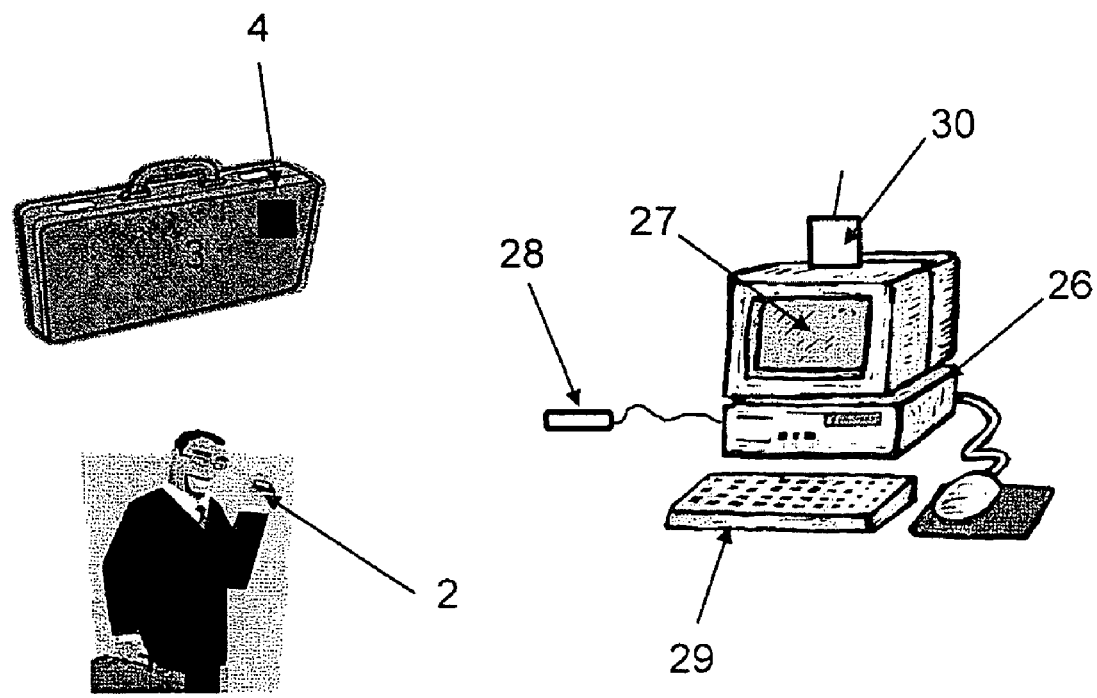
FIG. 1 is a schematic view of the portable container inventory control system of the present invention.

With reference to FIG. 1, the container inventory control system of the present invention also comprises user (workers) ID means 2, such as an ID card for each worker each having personalized identification information recorded thereon such as worker name and/or worker ID.

Again with reference to both FIGS. 1-2, the container inventory control system of the present invention further comprises a plurality of portable containers 3, each container having: container ID means 4, such as bar code or RFID chip each having identification information recorded such as container ID; one or more pads 5 located within the portable containers. The containers may be centrally stored on a shelf in a storage position. Each pad has a plurality of receptacles 6, each receptacle being configured for storing a specific tool. Each receptacle 6 has a corresponding RFID reader/writer 7 assigned thereto, to identify an item RFID tag 1 of the item stored in that receptacle in order to get the information of the stored item. There is a one-to-one relationship between the RFID reader/writer and the corresponding receptacle 6 so that each RFID reader/writer monitors any item bearing an RFID tag within that RFID reader/writer's receptacle.

As illustrated by FIG. 2, each pad further comprises at least one hub 8 connecting each RFID reader/writer 7 of each receptacle 6, the hub for controlling the reading, writing and verification each of the RFID reader/writers 7 of the receptacles 6 of a correspondent pad 5.

Figure 3:
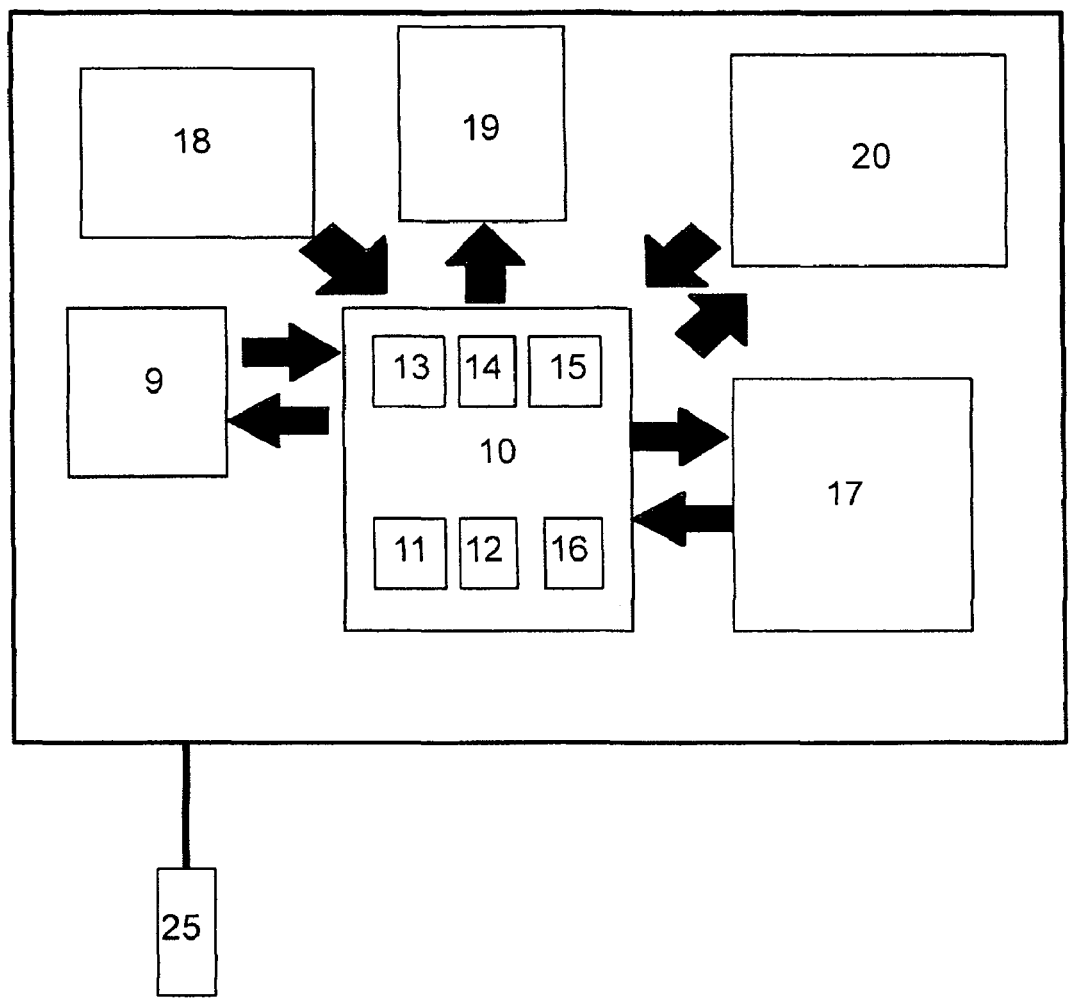
FIG. 3 is a schematic view of a hub in accordance with the portable container inventory control system of the present invention.

As illustrated by FIG. 3, each hub 8 in turn comprises: a hub controller 9 for: controlling the communication with each RFID reader/writer through a low level communication bus (i2c, serial, rs232 or any other), controlling the reading, writing and verification operations of a plurality of RFID readers/writers connected thereto, processing sensor information on macro commands received from a master controller.

A function controller 10 is connected to the hub controller 9. The function controller 10 includes:

power conditioning circuits 11: help to convert the power to a correct level to operate the hub. These circuits also clean the signal to eliminate interference in the hub power lines. power source control circuits 12;

low level communication controller 13, for controlling the communication between the hub and each RFID reader/writer connected thereof by means of the low level communication bus (i2e, serial, rs232);

output device controller 14 (such as LCD controller, output voltage conversion, etc); and input device controller 15 (such as touch sensor controller, de-bouncing circuits, analog to digital converters for accelerometer and other analog input, etc.)

memory means controller 16.

A memory means 17 is connected to the function controller 10. The memory means 17 may be such as flash memory, eeprom memory, memory card (sd, compact flash, etc) or USB storage device. The memory means 17 is used for storing transactions registered by each of the RFID readers/writers 7 connected to the hub 8, such as tool taking operations and for storing inventory information such as the ID of the tools 1a stored inside each pad the ID of each receptacle and the ID of each pad 5;

An input device 18 is connected to the function controller 10 for receiving input from devices such as—Buttons touch sense (capacitive or resistive), sensors(presence, rfid, acceleration, etc.).

An output device 19 is connected to the function controller 10 for sending an output to devices such as, light indicators (leds, light bulbs), LCD screens, e-inc, vfd or other screens, buzzers.

A wireless data transmitter 20 is connected to the function controller 10, for sending and receiving information to other hubs 8 corresponding to the same portable container 3 and to a CPU or other external computer equipment for determining the status of the inventory of each pad 5 as well as all the portable containers 3 and notify the respective absence of tools 1a.

A plurality of LED's and displaying means are connected to the hub 8 for indicating if all of the tools 1a assigned to each receptacle 6 controlled by the hub 8 corresponding to a pad 5 is stored in the tool's correspondent receptacle 6 or if any of the tools 1a is missing, in a preferred embodiment, there are two red leds 22, 22a, two blue leds 23, 23a and displaying means 24.

An energy source 25 is provided for each hub 8, comprising a battery for providing electricity to each component of the hub 8.

FIG. 1 illustrates an external computer system 26 having: a screen 27 for displaying information, identification reading means 28, such as a bar code reader, input means such 29, as a keyboard, wireless data sending and receiving means 30 for communicating with the hubs 8 of each pad 5 of a portable container 3 and a database containing the following information:

Information about each portable container 3 that is controlled by the system, such as portable container ID, ID of each pad 5 contained in the portable container 3, ID of each receptacle 6 corresponding to the pad ID and the ID of the tools 1a contained in each receptacle 6 and the information for servicing each tool 1a such as the maintenance.

Information about each worker that is allowed to take any of the portable containers 3, such as name and worker ID. Additionally, the system may contain information about the workers that are not allowed to take any portable container 3.

Privilege information of each worker, the privilege information including the following information: ID of the portable containers 3 that are allowed to be taken and accessed by each worker, and the ID of the tools stored 1a in each portable container 3 that are allowed to be taken by each worker.

The invention provides for system alerts. The computer system can display system alerts by using its screen 27 for informing the workers when all of the portable containers 3 are stored in their corresponding storage positions or when a portable container 3 has been taken by a worker either by showing a predetermined color in the screen 27 or by displaying related information such as a list of all of the portable containers 3 that had been taken and the workers that had taken each one of the portable containers 3.

The invention monitors portable container taking operation. When a worker wants to take a portable container 3 from a storage position he/she must identify himself/herself by passing his worker identification (ID) means 2 in the computer system's identification reader means 28. The worker identification (ID) means 2 is read by the computer system's computer system's identification reader means 28 and the worker name and/or worker ID is obtained. The worker name and/or worker ID is searched in the computer system 26 database.

The worker takes a portable container 3 from a shelf and brings it near the computer system 26. Next, the worker must identify the portable container 3 to the computer system 26 by allowing the computer system's ID reader 28 to read the portable container ID encoded in the portable container bar code label or RFID tag 4 or alternatively by directly entering the portable container ID into the computer system 26 by means of the keyboard 29.

The computer system 26 obtains the privilege information for the worker ID from the computers database, the privilege information comprising the ID of each portable container 3 that the worker is allowed to take and validates if the portable container 3 can be taken by the worker by comparing the portable container ID with the privilege information. Once the computer system 26 validates that the portable container 3 can be taken by the worker, the computer system 26 validates that portable container is not missing any tool 1a (or item) by verifying that each receptacle has the proper tool stored therein. The computer system also validates that no tools 1a require service such as maintenance, calibration repair, or replacement. The computer system sends a request for inventory information to each hub 8 in the portable container by means of the wireless data sending and receiving means 30. Upon receiving the request for inventory information, each hub 8 inquires from the connected RFID reader/writers 7 for validating that every tool 1a is in place and that the tool in place is the right tool for that receptacle. When the request for inventory is received by each of the hubs 8 in the portable container by means of their wireless data transmitter 20, each hub 8 obtains the inventory information and validation of its correspondent pad 5 by activating each of the RFID readers 7 connected to the hub 8 in order to read the RFID chips of the correspondent tools 1a. In such way, each hub 8 obtains the inventory information and validation comprising the ID of the tools 1a currently stored in the respective pad 5 and sends the thus-obtained inventory information and validation together with the portable container ID to the computer system 26 by means of their correspondent wireless data transmitter 20.

When the computer system 26 wirelessly receives the current inventory information from each hub 8 in the portable container 3 correspondent to the inventory information of each pad 5 inside the portable container 3, the computer system 26 compares the current inventory information with the complete inventory information correspondent to the portable container 3 in order to:

Check if the container 3 is complete. If the container 3 is incomplete, the computer system 26 notifies the worker by displaying in the screen 27 the missed tools.

Search in the computer database if one or more tools 1a are in need of calibration, maintenance, repair or service. If one or more tools need service, the computer system 26 notifies the worker by displaying in the screen 27 the tools 1a that need service and the kind of service needed.

If the portable container 3 is incomplete the worker has the options of:

Returning the portable container to the shelf; or

Checking out the incomplete portable container.

If the portable container 3 contains tools that are in need of service the worker has the options of:

Returning the portable container to the shelf; or

Taking out from the container the tools that need and checking out the container with the tools missing.

In the check out process the worker must enter a command in the computer system 26 in order to register the portable container 3 talking operation if the taking operation is being performed manually. Also the computer system 26 may detect the taking out operation trough either presence sensors or RFID sensors (not shown).

If the portable container 3 contains tools 1a that were not previously RFID tagged, the computer system 26 will further ask for another person to validate that such tools are stored in the portable container. Once another person validates that such tools are properly stored in the portable container he/she may enter a validation command in order to allow the worker to complete the taking operation.

The computer system 26 then registers the date and time of the taking operation and associates the portable container ID with the ID of the worker that checked out the portable container 3. If the worker decides to check out the portable container 3 with one or more tools missed, the computer system will register that the portable container 3 is being checked out with one or more tools missed by registering the ID of the tools that are missed from the portable container. Finally, the computer system 26 sends a wireless signal using its wireless data sending and receiving means 30 to each portable container's hub 8 for activating the out of the shelf functionalities of each hub 8. The signal is received by the wireless data transmitters 30 of each hub 8 and is processed by each hub 8 so that, each hub 8 activates their respective REID readers 7, which read the RFID chip 1 of the tool stored in their respective receptacle 6 every predetermined seconds (as previously configured, such as every 300 seconds). In this way, each hub 8 obtains the tool IDs of the tools missing from its correspondent pad 8 at the moment of check out (tool check-out inventory) and the tool IDs are recorded in the hub's memory 17.

Once each hub 8 receives the signal for activating their out of the shelf functionalities, they will obtain the inventory of tools 1a in their respective pad 5 each predetermined seconds (as previously configured, such as every 300 seconds) recording in the memory 17 the tools that are missed on every event of checking the inventory, which is one of the out of the shelf functionalities. The time between inventory checks shall be configured.

Once the worker checked out the portable container 3, he/she may take it to the jobsite and takes full responsibility for the portable container 3.

The invention provides portable container inventory control when the portable container 3 is out of the shelf.

During the time the portable container 3 is out of the shelf, e.g., at the jobsite, when the worker needs to take any tool 1a that is stored inside of the portable container 3 he/she has to open the portable container 3 and take out the pad 5 (if needed) that contains the desired tool 1a.

Alternatively, in other embodiments of the invention, each portable container 3 may have locking means and identification validation means (not shown), so that when the worker needs to open the portable container 3, it will be necessary to authenticate himself/herself by means of the identification validating means in order to gain access to the portable container 3 by unlocking the locking means if the validation of the worker is successful.

Each hub 8 has memory means 17 for storing transactions registered by each of the RFID readers 7 of the correspondent hub 8, such as tools that are missed from every receptacle 6 in the respective pad 5.

When the worker removes a tool 1a from a receptacle 6 from a given pad 5, and the respective hub 8 activates each RFID reader 7 in the pad 5 to obtain the inventory of tools in the pad 5 in accordance with the predetermined configured period of time, the correspondent RFID reader 7 will fail to receive the information of the RFID chip 1 correspondent to the taken/removed tool. When the hub 8 compares the list of all of the tool ID's detected by all RFID readers 7 in the correspondent pad 5 and their related receptacle ID with the tool check-out inventory stored in memory 17, the comparison operation between the tool ID and receptacle ID that the worker has just taken and the correspondent tool ID and receptacle ID stored in the hub memory 17 will not match and the hub 8 will then acknowledge the taking operation of the specific tool ID from the specific receptacle 6. Once the hub 8 acknowledges the taking operation, the operation is recorded in the memory means 17 by recording the tool ID, receptacle ID, and the time and date in which the tool was taken.

When the worker has ended the use of a tool he/she must return the tool to the same pad 5 and receptacle 6 where the tool was taken.

The invention provides a portable container inventory verification system.

Once the worker needs to move the portable container 3 to a different location or is ready to return the portable container 3, he/she must verify that all of the tools registered in the tool check-out inventory stored in the memory 17 of each hub 8 are properly stored in their correspondent receptacle 6 and pad 5 through the process described below.

Each of the hubs includes an automatic inventory verification system—which is another out of the shelf functionality—for verifying that all of the tools 1a registered in tool check-out inventory stored in the memory 17 of each hub 8 are properly stored in their correspondent receptacle 6 and pad 5. The system is activated by the push of a button 31, in any of the hubs 8 correspondent to any pad 5 belonging to the respective portable container 3, which button-push is interpreted by the hub 8 (inventory requesting hub) as an order for obtaining the current inventory of the correspondent pad 5 and also for sending a request for current inventory information signal to the rest of the hubs 8 of the portable container 5. The request to the other hubs is send by means of the wireless data transmitter 20 of the inventory requesting hub and is received by the rest of the hubs 8 in the portable container 3 by means of their correspondent wireless data transmitters 20.

Each of the hubs 8, upon receipt of the request for sending current inventory information, obtains the inventory of tools in their respective pad 5 by activating their respective RFID readers 7, which read the RFID chip 1 of the tool 1a stored in their respective receptacle 6. In this way, each hub 8 obtains a list comprising the tool IDs of each tool 1a stored in each receptacle 6, and a NIL if no tool is stored in any receptacle 6.

Each hub 8, upon receipt of a response from each REID reader 7 in its respective pad 5 carries out the following validations:

validates that information was received from all REID readers 7 in the respective pad 5;

validates that each tool 1a in the pad 5 is stored in its correspondent receptacle 6 and that the inventory of tools in the correspondent pad is complete—equal to the tool check-out inventory—by comparing the current inventory information of the correspondent pad 5 with the tool check-out inventory information looking for missing tools and inconsistencies between the tool IDs contained in the current inventory information and the tool IDs contained in the tool check-out inventory for each receptacle 6 of the pad 5. The hub 8 compares the list of all tool ID's detected by all RFID readers 7 in the correspondent pad and their related receptacle ID—current inventory information—with the tool check-out inventory for the correspondent pad 5 stored in memory. If one or more of the tool IDs for a correspondent receptacle ID contained in the current inventory information is different from the tool ID contained in the tool check-out inventory for the same receptacle ID stored in the hub memory 17 or if the inventory information for a correspondent receptacle ID contained in the current inventory information comprises NIL whereas the inventory information for the receptacle ID in the tool check-out inventory comprises a tool ID then an internal Flag 1 is set to false and stored in the memory 17 of the correspondent hub 8 indicating that a tool is misplaced, missing or that a wrong tool was placed instead, and the receptacle IDs and the ID of the misplaced or missing tool is stored in memory 17 as an inventory status information. If all of the comparison operations between the tool IDs and their correspondent receptacle ID contained in the current inventory information and the tools IDs and their correspondent receptacle IDs contained ill the tool check-out inventory for the correspondent pad 5 are successful then the Flag 1 is set to true and stored in the memory 17 of the correspondent hub 8 indicating that all tools 1a in the pad 5 are stored in its correspondent receptacle 6.

Once each hub 8 validates that information was received from all RFID readers 7 in the respective pad 5, that each tool 1a in the respective pad 5 is stored in its correspondent receptacle 6 and that the inventory of tools in the respective pad 5 is complete, each hub 8 wirelessly send the status of the Flag 1 to each hub 8 in the portable container 3.

Once each hub 8 receives the Flag 1 status from the other hubs 8, each hub verifies the Flag information received from the rest of the hubs. If Flag 1=True for each Hub 8 in the container, then each hub sets a Flag 2=true and stored in memory 17, indicating that all of the pads 5 in the container are complete, If one of the received Flags 1 is equal to False, then each hub 8 sets a Flag 2=False and stored in memory, indicating that at least one of the pads is incomplete or have a tool is stored in a wrong receptacle 6 or misplaced.

The displaying means 24 of each hub 8 will display the inventory status of the respective pad 5 and portable container 3 container and the blue and red led of each pad for displaying the status of the inventory in each respective pad (pad's inventory blue and red leds) 22, 23 and the blue and red led of each pad for displaying the status of the pads in the container (container's inventory blue and red leds) 22a, 23a are turned on by the respective hub 8 in accordance with the following table:

Control of each Pad's inventory LEDs

| Hub flags | Pad's inventory blue led | Pad's inventory red led | Container's inventory blue led | Container's inventory red led | Displaying means |
|---|---|---|---|---|---|
| Flag 1 = True, Flag 2 of each container = True | ON | OFF | ON | OFF | Will inform that pad and container are complete |
| Flag 1 = True, any of the other hub flags = | ON | OFF | OFF | ON | Will inform that there is a missed tool OR Incorrect |

-continued

| Hub flags | Pad's inventory blue led | Pad's inventory red led | Container's inventory blue led | Container's inventory red led | Displaying means |
|---|---|---|---|---|---|
| False | | | | | tool in pad No. "x" receptacle No. "y", will display the pad ID or IDs and the correspondent receptacle ID or IDs containing a wrong or missed tool |
| Flag 1 = False, any of the other hub flags = False | OFF | ON | OFF | ON | Will inform that there is a missed tool OR Incorrect tool in pad No. "x" and receptacle No. "y" will display the pad ID or IDs and the correspondent receptacle ID or IDs containing a wrong or missed tool (including the ID of the own pad |
| Flag 1 = False, any of the other hub flags = True | OFF | ON | ON | OFF | Will inform that there is a missed tool OR Incorrect tool in the own pad only and will display the own pad ID and the correspondent receptacle ID or IDs containing a wrong or missed tool. |

Pad's inventory blue led 22 is turned on in each pad 5 by the correspondent hub 8 when Flag 1 is set to true, indicating that the correspondent pad is complete and that each tool 1a is stored in its correspondent receptacle 6. Pad's inventory red led 23 is turned on when Flag 1 is set to False, indicating that there is at least one tool missed or stored in an incorrect receptacle 6.

Container's inventory blue led 22a is turned on in each pad by the correspondent hub 8 when the Flag 1 information from each hub 9 is set to true, indicating that the container is complete or that there is at least one tool missed or stored in an incorrect receptacle 6 in the own pad—in such case, the pad's inventory red led is turned on—. Container's inventory red led is turned on in each pad by the correspondent hub 8 when the Flag 1 information from at least one hub 8 (other than own hub) is set to false, indicating that there is at least one tool missed or stored in an incorrect receptacle 6 in at least one pad (other that own pad).

The invention includes a portable container returning operation.

When a worker wants to return a portable container 3 to its storage position he/she must identify himself/herself by passing his worker identification (ID) means 2 in the computer system's 26 identification reading means 28 reader. The worker ID means 2 is read by the computer system's 26 identification reading means 28 and the worker name and/or worker ID is obtained.

The worker name and/or worker ID is searched in the computer system database and the ID or ID's of the portable containers 3 that the worker checked out is displayed in the screen 27.

Next, the worker must identify the portable container 3 to be returned into the computer system 26 by allowing the computer system's identification reading means 28 to read the portable container ID encoded in the portable container bar code label or RFID tag 4 or alternatively by directly entering the portable container ID into the computer system 26 by means of the keyboard 29.

The computer system 26 validates that the portable container ID correspond to the ID of any o the portable containers that the worker checked out. If the validation fails, the computer system 26 does not allow continuing with the returning operation unless the user returning the portable container has privileges for returning portable containers not assigned to him/her, on the contrary, if the validation succeeds, the worker is allowed to continue with the returning operation.

Once the computer system 26 validates that the portable container can be returned by the worker, the computer system 26 validates that the portable container 3 is not missing any tool 1a and that each tool 1a is stored in its correspondent receptacle 6 by sending a request for inventory status to each hub 8 in the portable container 3 by means of the wireless data transmitter 20. When the request for inventory status is received by each of the hubs 8 in the portable container 3 by means of their wireless data transmitter 20, each hub 8 sends its inventory status information and flags status of its correspondent pad S.

When the computer system 26 wirelessly receives the current inventory information and flag status from each hub 8 in the portable container 3 correspondent to the inventory information of each pad 5 inside the portable container 3, the system checks if the status of any of the pad's flags is false. If any of the flags is false the computer system 26 will not allow the worker to continue with the returning operation since a False flag means that there is a tool missing or stored in a wrong receptacle 6 (unless a supervisor with privileges records and documents the fact of tools missing and authorize the returning operation) and will display the following information in the screen:

If a Flag 1—False is detected, then it will display in screen 27 a list containing the Pad ID, the receptacle ID, the ID of the tool detected and the ID of the expected tool.

If a Flag 2=False is detected, then it will display in screen 27 a list containing the Pad ID, the receptacle ID and the ID of the missing tool.

If the status of all Flags is true, then the computer system 26 will display in the screen 27 the portable container inventory information and will allow the worker to continue with the returning operation and will send a request for "transaction history"—which contains all the tool taking and returning operations registered by each hub—to each hub 8 in the portable container 3 by means of the wireless data sending and receiving means 30. When the request for "transaction history" is received by each of the hubs S in the portable container 3 by means of their wireless data transmitters 20, each hub 8 sends the tool taking and returning operations registered in memory. At this stage, the worker may select any of the tools from the inventory information using the keyboard 29 and it is given an option to report any problem with the tool, such as in need of service or replacement. Each report is stored in the computer system database.

If the portable container contains tools that were not previously RFID tagged, the system will further ask for another person to validate that such tools are stored in the portable container. Once another person validates that such tools are properly stored in the portable container he/she may enter a validation command in order to allow the worker to complete the returning operation.

In order to complete the returning operation, the worker returning the portable container (or any other authorized person) shall enter a command in the computer system 26 in order to register the portable container returning operation. The computer system 26 then registers the date and time of the returning operation and associates the portable container ID with the ID of the worker that checked in the portable container. Finally, the computer system 26 sends a wireless signal using its wireless data sending and receiving means 30 to each portable container's hub 8 for deactivating the out of the shelf functionalities of each hub 8. The signal is received by the wireless data transmitters 20 of each hub 8 and is processed by each hub 8 so that, each hub stops obtaining the inventory of tools 1a in their respective pad 5.

Although each hub 8 has been described with its own wireless data transmitter 20, in other embodiments of the invention, each hub 8 may be connected to each other and all of them may be connected to only one wireless data transmitter (not shown), which may be used by each hub S.

The Identification (ID) means 2 for each worker may comprise a bar code label, a RFID card or biometric identification means. Also, although it was described that the identification (ID) means 4 for each portable container comprises a bar code label, it may be used any kind of identification means including an RFID chip.

In addition to the computer system, it can be used any portable computer having wireless data sending and receiving means for verifying the status of the inventory of each pad at any moment, wherein each portable computer contains a database includes the following information:

Information about each portable container that is controlled by the system, such as portable container ID, ID of each pad contained in the portable container, ID of each receptacle corresponding to the pad ID and the ID of the tools contained in each receptacle.

Status of each tool such as in need of calibration, maintenance, repair or replacement.

Information about each worker that is allowed to take any of the portable containers, such as name and worker ID. Additionally, the system may contain information about the workers that are not allowed to take any portable container.

Privilege information of each worker, the privilege information including the following information: ID of the portable containers that are allowed to be taken and accessed by each worker, and the ID of the tools stored in each portable container that are allowed to be taken by each worker.

In other embodiments of the invention, each hub 8 of each portable container 3 may synchronize the taking and returning operations in real time with the computer system 26 if the portable containers 3 are used inside a predetermined area inside which the signal coverage of the wireless data transmitter 20 of each hub and of the wireless data sending and receiving means 30 is guaranteed.

Additionally, there may be attached to each portable container 3 or each pad 5 a Global Positioning System having memory means for registering places, times and dates in order to relate the information with the places an times where the tools 1a of a portable container 8 were used, which is very useful for locating lost tools.

There may be also used real time positioning systems such as RFID RTLS if the portable containers 3 are always used inside a restricted area. Items stored within the portable containers may be weapons, jewelry, medical instruments etc.

Finally it must be understood that the portable container inventory control system of the present invention, is not limited exclusively to the embodiments above described and illustrated and that the persons having ordinary skill in the art can, with the teaching provided by the invention, to make modifications to the portable container inventory control system of the present invention, which will clearly be within of the true inventive concept and of the scope of the invention which is claimed in the following claims.

What is claimed is:

1. A container inventory control system for controlling inventory of items contained inside of portable containers, comprising:
   a) one of more items;
   b) item identification means joined to each item;
   c) user identification means for each user authorized to handle the items of a portable container;
   d) at least a portable container, each container having:
      one or more pads,
         each pad having one of more receptacles, each configured for storing a specific one of the items;
         one of more reader/writer means, each receptacle having a different, corresponding reader/writer means assigned thereto, to identify item identification means to get the information of said item, there being a one-to-one relationship between each RFID means and corresponding receptacle, and
         at least one hub in each pad, the at least one hub of each pad connecting each reader/writer means of each receptacle, each pad having memory means for storing transactions registered by each of the reader/writer means for controlling the reading, writing and verification of each of reader/writer means of the receptacle of a correspondent pad;
   e) identification means in each portable container to identify the portable container; and
   f) an external computer system having:
      a screen for displaying information,
      identification reading means, for reading the user identification means, to check if the user is authorized to handle a portable container and for identity the portable container;
      input means for introducing information to said external computer system,
      wireless data sending and receiving means for communication with the hubs of each pad of a portable container; and
      a database including information about each portable container controlled by the system, information about each user allowed to take a portable container, privilege information of each user and the identification of items stored in each portable container allowed to be taken by each user, and system alerts for informing users when all of the portable containers are stored in corresponding storage positions or when a portable container has been taken by a user.

2. A container inventory control system according to claim 1, wherein the items contained inside of portable containers are selected from the group consisting of tools, weapons, jewelry, and surgical instruments.

3. A container inventory control system according to claim 1, wherein the user identification means are selected from fingerprint reading means, identification card reading means for each user, a computer system including identification reading means, input means and a database, having personalized identification information recorded such as user name and/or user identification data.

4. A container inventory control system according to claim 1, wherein the item identification means are selected from the group consisting of RFID tag for each specific item and electronic identification readers.

5. A container inventory control system according to claim 1, wherein reader/writer means comprising RFID reader/writers.

6. A method for controlling the inventory of items contained inside a portable container, comprising:
   reading the identification of each item contained in each pad of each portable container by providing each item with an RFID tag permanently joined thereto and providing a dedicated RFID reader writer for each specific item, in a pad of the portable container;
   recording the conditions of the items contained in a portable container, determining the presence or absence of one or more items, their conditions of operation, and the time and date in which the items were used;
   reading and recording each user that is taking a portable container, checking if is authorized or not to take any portable container, the time and date in which the user took a specific portable container and the time and date, the presence of absence of one or more items and conditions of the items of the portable container, when the user returns the portable container;
   so as to provide information about which user took a portable container, the time and date in which the user took the portable container and the time and date in which the user returned the portable container, the conditions of presence or absence of one or more items from the portable container and the conditions of operation of the items contained in the portable container.

7. The method as claimed in claim 6, wherein the step of recording the conditions of the items contained in a portable container, is carried out by a hub in the portable container, to which is connected each reader/writers of the pad of the portable container.

8. The method as claimed in claim 6, wherein the step of reading and recording each user including:
   providing privilege information for a user identification from the database of the computer system;
   identifying each portable container that the user is allowed to take;
   validating if the portable container can be taken by the user by comparing the portable container identification with said privilege information;
   requesting for inventory information to each hub in the portable container through the RFID reader/writers;
   inquiring, through the hub, from the RFID reader/writer means, to validate that every item is on place and that the item in place is the right one;
   validating, that the portable container has not an absence of any item and that no item require service such as maintenance, calibration repair, or replacement;
   so that each hub obtains the inventory information and validation from the reader/writer means, comprising the identification of the tools currently stored in the respective pad and send said inventory information and validation together with the portable container identification to the computer system by means of their correspondent wireless data transmitter.

9. The method as claimed in claim 6, comprising:
   selecting, if the portable container is incomplete or contains items that are in need of service, requesting to identify which user returned an incomplete portable container, the time and date in which used and returned said incomplete portable container, and either: returning the portable container or checking out the incomplete portable container and entering a command in the computer system by means of the keyboard of the computer system in order to register the portable container taking operation; and recording the time and date of the taking operation and associating the portable container identification with the user identification that checked out the portable container.

10. A container inventory control system, comprising:
a portable container, said container including
a) a pad located in an interior of the container,
b) plural items removably storable in the pad,
c) plural receptacles located in the pad, each receptacle having a shape forming an opening in the pad matching an overall shape of a corresponding different one of the tools, each receptacle assigned for storing the corresponding tool,
d) an RFID identification permanently joined to each item,
e) plural RFID readers, a different reader assigned to each receptacle so that there is a one-to-one relationship between each RFID reader and corresponding receptacle, each reader positioned adjacent the assigned corresponding receptacle and configured for executing a reading operation of reading the RFID identification of the corresponding item when stored within the assigned receptacle,
f) a hub connected to each of the RFID readers, the hub comprising memory for storing transactions registered by each of the readers, the hub configured for controlling the reading operation of each reader, and
g) a machine-readable container identification of the container, the identification including data identifying the container;
user identifications, each user identification containing data indicating a different user authorized to handle the items and authorized to handle the container; and
a computer system wirelessly in communication with the container, the computer system including a) an identification reader for i) reading the data contained on user identifications and configured for determining from the read data whether the user is authorized to handle a portable container and ii) reading the data included in the container identification identifying the container, and b) a database including information about the container, information about each user authorized to handle the container, identification of the item assigned to each receptacle, and privilege information identifying each tool that each user is authorized to remove from the tool's assigned receptacle.

11. The container inventory control system of claim 10, comprising:
plural of said portable container,
wherein said database further comprises information identifying each of said containers from the other containers, information identifying which containers each user is authorized to handle, and privilege information identifying each tool from each container that each user is authorized to remove from the tool's assigned receptacle.

* * * * *